Figure 1:
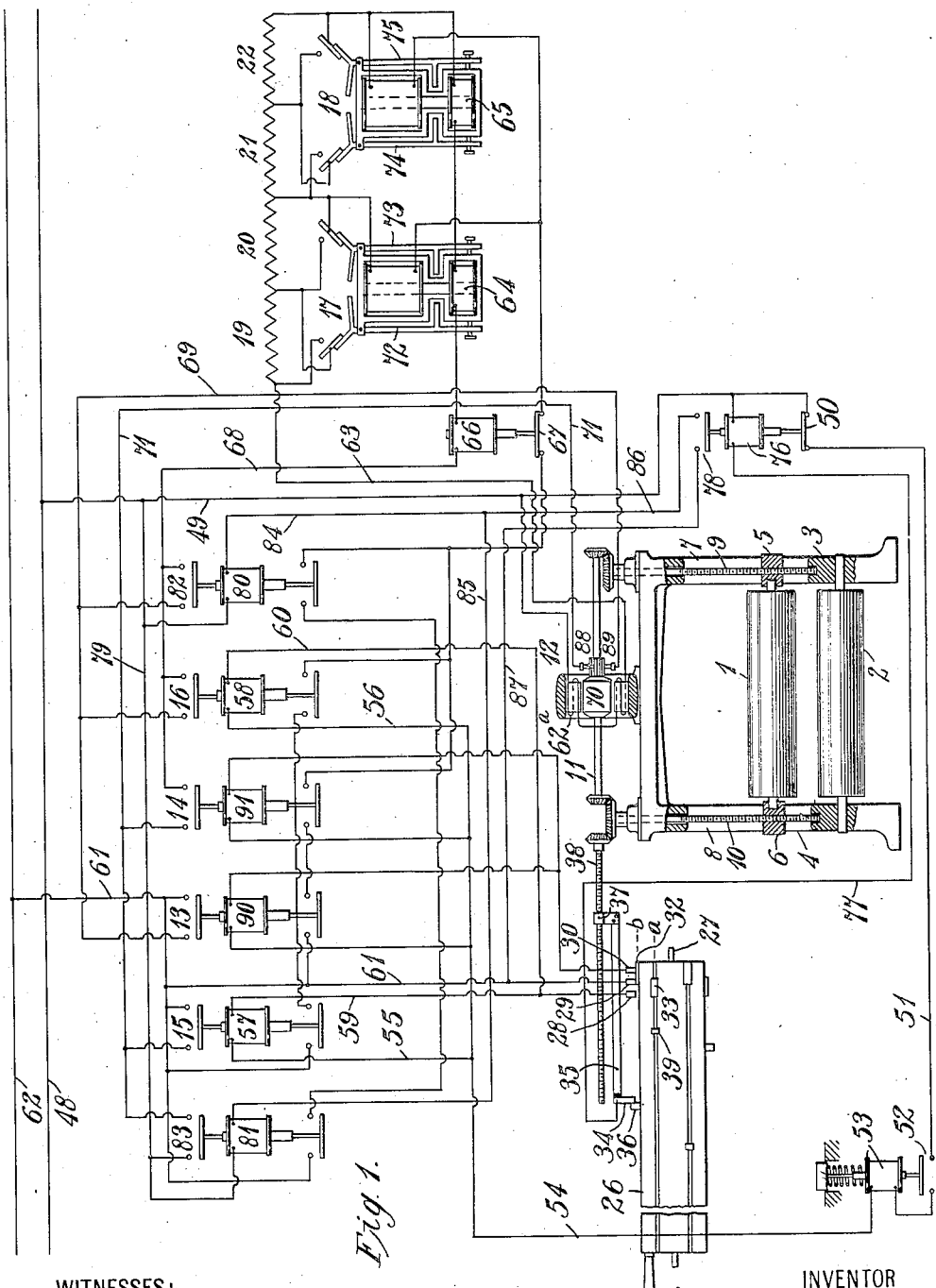

H. A. LEWIS.
SYSTEM OF ELECTRIC MOTOR CONTROL.
APPLICATION FILED MAY 22, 1911.

1,049,377.

Patented Jan. 7, 1913.
2 SHEETS—SHEET 1.

WITNESSES:
Fred H. Miller
R. J. Barbour

INVENTOR
Harry A. Lewis
BY
Wesley G. Carr
ATTORNEY

H. A. LEWIS.
SYSTEM OF ELECTRIC MOTOR CONTROL.
APPLICATION FILED MAY 22, 1911.
1,049,377.
Patented Jan. 7, 1913.
2 SHEETS—SHEET 2.
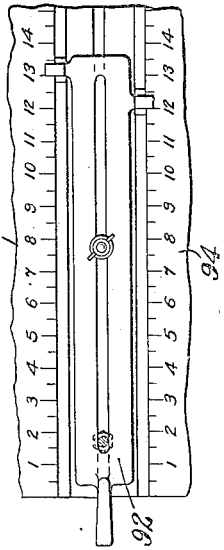
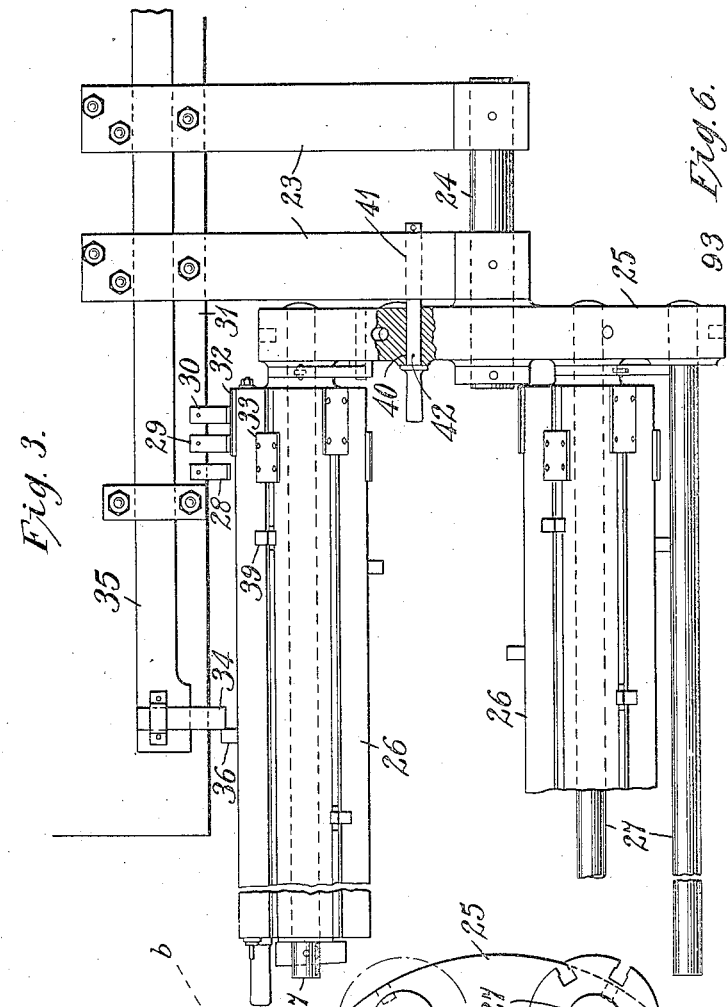
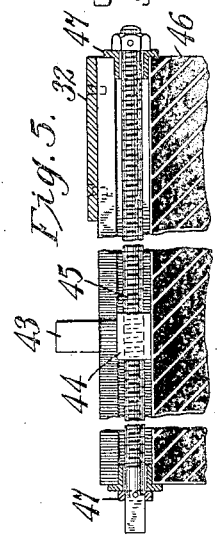
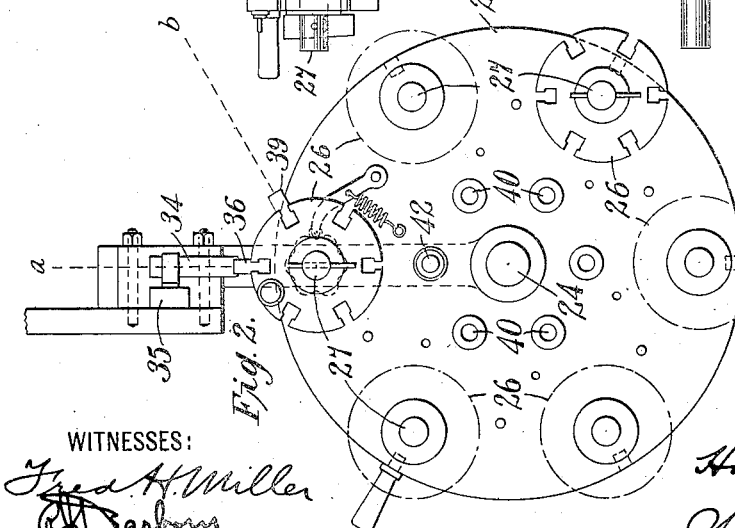
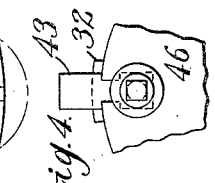
WITNESSES:
Fred H. Miller
INVENTOR
Harry A. Lewis
BY
Wesley G. Carr
ATTORNEY

UNITED STATES PATENT OFFICE.

HARRY A. LEWIS, OF NORRISTOWN, PENNSYLVANIA, ASSIGNOR TO WESTINGHOUSE ELECTRIC AND MANUFACTURING COMPANY, A CORPORATION OF PENNSYLVANIA.

SYSTEM OF ELECTRIC-MOTOR CONTROL.

1,049,377.  Specification of Letters Patent.  Patented Jan. 7, 1913.

Application filed May 22, 1911. Serial No. 628,734.

*To all whom it may concern:*

Be it known that I, HARRY A. LEWIS, a citizen of the United States, and a resident of Norristown, in the county of Montgomery and State of Pennsylvania, have invented a new and useful Improvement in Systems of Electric-Motor Control, of which the following is a specification.

My invention relates to controllers for electric motors and it has special reference to semi-automatic controllers and control systems for governing the speed and direction of rotation of electric motors which are adapted to adjust the position of the rolls of a steel mill.

The object of my invention is to provide, in a system of the class above indicated, a simple, durable and inexpensive control mechanism which may be readily adjusted to limit the minimum and maximum spacing of the rolls and thus facilitate the production of any one of a number of standard sections of iron or steel rods or bars to suit the requirements of the mill.

In steel rolling mills and similar plants, at least one of every pair of rolls is adjustable in order to gradually bring the sections of the iron or steel to the desired dimensions. The adjustment of the movable roll is frequently accomplished by an electric driving motor and the control system for governing the motor is commonly known as a screw-down controller. It has been my aim to produce a controller of this character having a number of settings or adjustments which automatically limit the movement which can be effected by the screw-down motor, in order to produce rods or bars of uniform sectional dimensions without necessarily employing a particularly skilled attendant.

Figure 1 of the accompanying drawings is a diagrammatic view of a control system embodying my invention. Fig. 2 is an end elevation and Fig. 3 a side elevation of a controller which forms a part of the system of Fig. 1 and is constructed in accordance with my invention. Fig. 4 is an end view, Fig. 5 a longitudinal section and Fig. 6 a plan view of a portion of one of the drums which are embodied in the structure shown in Figs. 2 and 3.

Referring to the drawings, 1 and 2 represent a pair of rolls such as are utilized in steel mills for reducing ingots to rods or bars of the desired sectional dimensions, the roll 2 being rotatably supported in standards 3 and 4 which form parts of a frame or support. The roll 1 is rotatably mounted in blocks 5 and 6 which are adjustably supported in guideways 7 and 8 in the frame by means of screws 9 and 10. The surfaces of the rolls are maintained parallel by making the screws 9 and 10 identical and coupling them to the shaft 11 of an electric driving motor 12. The arrangement of parts is such that when the motor is rotated in one direction, the roll 1 is moved away from the roll 2 and when the motor is operated in the reverse direction, the roll 1 is moved toward the roll 2.

The motor 12 is controlled by reversing switches 13 and 14, and 15 and 16 and accelerating switches 17 and 18 which, in turn, are governed by a semi-automatic controller or control mechanism which is completely illustrated in Figs. 2 to 6, inclusive.

The accelerating switches 17 and 18 may be of any suitable type, but I prefer to employ magnet switches which act automatically to gradually short circuit resister sections 19, 20, 21 and 22 such as those shown and described in my co-pending application, Serial No. 628,733, filed of even date herewith.

Referring specially to Figs. 2 and 3, the controller here shown comprises a supporting frame 23, a shaft 24 mounted therein, a disk or plate 25 rotatably supported on the shaft 24 and a plurality of contact-bearing drums 26. The drums 26 are severally mounted on rods or shafts 27 which are secured to the disk or plate 25 and extend outwardly therefrom in parallel lines. A set of stationary contact fingers 28, 29 and 30 are secured to an arm 31 of the frame 23 and are adapted to coöperate with contact ring segments 32 and 33 which form parts of the drums 26. A contact finger 34 is secured to the outer end of an arm 35 and is adapted to coöperate with contact projections 36 of the drums 26 to limit the rotation of the motor 12 in one direction, as hereinafter pointed out. The arm 35 is secured to a traveling nut 37 which is mounted on a lead screw 38, as shown in Fig. 1 of the drawings. The lead screw is geared to the adjusting screws 9 and 10, and consequently, the position of the contact finger 34 depends directly on the relative position of the rolls 1 and 2. It is therefore evident that by properly locating the contact member 36 of the drum, the ultimate thickness of the rod or bar which is being rolled may be determined.

The contact segment 32 is adapted to bridge contact fingers 30 and 29 and produce rotation of the motor 12 in one direction and the contact segment 33 is adapted to bridge the fingers 28 and 29 to produce rotation of the motor in the opposite direction, the contact projection 36 being in line with the contact segment 32 and another limiting contact member 39 being in line with the contact segment 33 to limit the motor travel in the opposite direction.

As hereinafter pointed out, all of the contact members which are secured to or form parts of the drums 26 are electrically connected to a single conductor and, consequently, the drum itself may be an aluminum casting having raised portions to constitute the contact members or may be of some other very simple and cheap construction. By providing a number of drums having the limiting contact members 36 and 39 properly located, it is only necessary to adjust the position of the disk 25, in order to bring the proper drum into action for producing rods or bars of the desired sectional dimensions. The disk 25 is provided with a number of holes 40 which correspond in number and location to the shafts or rods 27 and are adapted to register with a hole 41 in the frame 23, the position of the disk being readily fixed as desired, by means of a pin 42 which extends through one of the holes 40 and into the hole 41.

Each of the drums 26 is adapted to occupy several different positions in order to increase the number of possible standard sections of material which may be produced by very simple adjustments of the control apparatus.

In order to enable the same control mechanism to be utilized for producing a rod or bar of such dimensions as are not provided for on any of the drums 26, I have provided an adjustable attachment by means of which the limiting contact members 36 and 39 may be set to any desired position. This attachment or structural arrangement is illustrated, on a larger scale, in Figs. 4 and 5 of the drawings, to which reference may now be had.

As here shown, a contact member 43, which corresponds to the contact member 36 of Fig. 3, is provided with a projection or enlargement 44 having a tapped hole to receive an adjusting screw 45 which extends longitudinally of the drum 46 on which it is mounted and is rotatably supported at its ends in bushings 47. One end of the shaft 45 extends beyond the end of the drum and is squared or provided with a flat surface to receive a wrench or handle (not shown) by which the screw may be rotated.

It is evident that, when the screw is rotated, the contact member 43 is adjusted along the drum and, consequently, it may be placed in any desired position, according to the thickness of the special rod or bar which is to be rolled. It is evident that both the contacts 36 and 39 may be adjusted as the contact 43 is adjusted.

When certain of the adjustable contacts bear a fixed relation to each other, they may be arranged in pairs, as shown in Fig. 6, and made integral with, or attached to a single adjustable member 92 and the drum may be graduated as shown at 93 and 94 to indicate the distance between rolls, corresponding to the setting of the contact member.

The structure of the control apparatus may be materially varied within the spirit and scope of my invention.

The operation of the controller and the circuit connections of the system are as follows: Assuming that the rolls 1 and 2 are rotated by some suitable engine or motor, not shown, that an ingot has just been rolled into a bar of the proper dimensions and that it is desired to separate the rolls preparatory to operating on a new ingot, if the drum 26, which is adjacent to the contact fingers 28, 29 and 30, is moved into position $a$ and push button switch 52 is closed, a circuit is established from any suitable source of energy, through a line conductor 48 to conductor 49, magnet switch 50, conductor 51 through push button switch 52, coil 53 which holds the push button switch closed, conductor 54, conductors 55 and 56, magnet windings 57 and 58, conductors 59 and 60, contact fingers 28 and 29 and conductor 61 to opposite line conductor 62. These circuits, when completed, close the motor-reversing switches 15 and 16 and establish a motor circuit from conductor 49 through field magnet winding $62^a$, conductor 63, resister sections 19 to 22, inclusive, coils 65 and 64 of magnet switches 18 and 17, coil 66 of relay switch 67, conductor 68, switch 16, conductor 69, motor armature 70, conductor 71, switch 15 and conductor 61 to the opposite line conductor 62. The motor will immediately accelerate in such direction as to raise the movable roll 1 and to cause contact finger 34 to move toward the limiting contact member 39, the movable contact-bearing arms 72, 73, 74 and 75 being successively actuated to gradually short circuit resister sections 19, 20, 21 and 22. Since the magnet switches form no part of my present invention and are fully set forth and described in my co-pending application, I deem it unnecessary to include a detailed description of them.

The contact member 39 is so located that the contact finger 34 will be brought into engagement with it when the rolls 1 and 2 are sufficiently separated to receive an ingot of the standard size. Consequently, it is only necessary for the attendant to actuate the push button in starting the motor, the limiting contact 39 being depended upon to bring the motor to rest at the proper time. This action is accomplished by the establishing of a circuit from conductor 49, through magnet winding 76 of relay switch 50, conductor 77, contacts 34 and 39 and contact 29 which is connected therewith through the drum to conductors 61 and 62. The relay switch 50, when energized, interrupts the circuit which was completed through the push button switch 52 and the reversing switch coils, thereby permitting the push button switch to be opened by reason of the deënergizing of its coil 53.

In addition to opening the switch 50, the coil 76, when energized, closes the switch 78 and completes a circuit from conductor 49, through conductor 79, coils 80 and 81 of switches 82 and 83, conductors 84 and 85, conductor 86, switch 78, conductor 87 and conductor 61 to opposite line conductor 62. The coils 80 and 81, when energized, close the switches 82 and 83 and complete a dynamic breaking circuit from armature terminal 88, through conductor 71, switch 83, conductor 79, conductor 49, field magnet winding 62, conductor 63, resistance sections 19 to 22, inclusive, coils 64 and 65, coil 66 of relay switch 67, conductor 68, switch 82 and conductor 69 to the opposite armature terminal 89. The motor is evidently brought to rest very quickly since full load is applied to it at all times by reason of its permanent connection to the adjusting screws 9 and 10.

When it is desired to lower the rolls, the drum is moved into position b, in which position the contact fingers 29 and 30 are bridged by the contact member 32 of the drum and circuit connections are established as soon as the push button switch 52 is again closed by the attendant, through the coils 90 and 91 of the switches 13 and 14. These switches complete the motor circuit for the opposite direction of rotation and the rolls may be stopped at any point by moving the drum 26 in the one direction or the other so as to break the contact between the fingers 29 and 30 and the segment 32. The motor is thus started and stopped in gradually reducing the section of the iron or steel that is being rolled and there is no danger of spoiling the bars by bringing the rolls too close together, since the finger 34 will come into engagement with the limiting contact 36 and will automatically bring the motor to rest when the rolls have been adjusted to the proper position to produce the desired sectional dimensions.

When the finger 34 engages the contact 36, circuit is established through the coil 76 of the relay switch 50, exactly the same as when the finger 34 engaged the contact 39.

The circuit connections of the system illustrated may be varied within the spirit and scope of my invention, and I desire that only such limitations shall be imposed as are indicated in the appended claims.

I claim as my invention:

1. A control mechanism comprising stationary contact fingers, a rotatively adjustable support, a plurality of contact-bearing drums, each rotatively mounted on the support and having contact segments which are adapted to coöperate with the stationary fingers.

2. A control apparatus comprising an adjustable support, a plurality of contact-bearing drums rotatively mounted thereon, a plurality of stationary contact fingers adapted to coöperate with the contact segments of one of the drums according to the adjustment of the support.

3. A control drum having non-adjustable contact segments and other contact segments adjustable longitudinally thereof, in combination with stationary fingers to engage said non-adjustable segments, and a movable finger to engage said adjustable segments.

4. A rotatively adjustable but normally stationary control drum having a plurality of longitudinal slots or grooves in its surface, non-adjustable contact segments secured to the drum in line with the slots, adjustable contact members supported in the slots, and means for moving the adjustable members longitudinally of the drum, in combination with stationary fingers to engage the non-adjustable segments and a movable finger to engage the adjustable contact members.

5. A control drum having a plurality of longitudinal slots or grooves in its surface, non-adjustable contact segments secured to the drum in line with the slots, adjustable contact members supported in the slots, and rotatively supported adjusting screws for said adjustable members.

6. In a screw-down controller, the combination with relatively movable rolls, an electric motor for adjusting one of the rolls, independently operated switches for governing the acceleration and the direction of rotation of the motor, and a control apparatus for governing the switches and limiting the ultimate adjustment of the rolls in both directions, said apparatus comprising stationary contact fingers, a plurality of contact-bearing drums and means for so adjusting the drums as to effect a coöperation between the contact segments of one of the drums and the stationary fingers, the limiting contact members of the several drums being dissimilarly located.

7. The combination with a rotatively adjustable but normally stationary drum having a plurality of non-adjustable contact segments and a plurality of longitudinally adjustable contact members, of a plurality of stationary contact members to engage the non-adjustable drum segments, and a longitudinally movable contact member to engage the adjustable contact members.

In testimony whereof, I have hereunto subscribed my name this 17th day of May, 1911.

HARRY A. LEWIS.

Witnesses:
G. CARROLL HOOVER,
R. W. McGARVEY.